May 5, 1931. H. SEGAL 1,804,184

AUTOMATIC SAFETY STOP

Filed Dec. 18, 1929

INVENTOR.
Hyman Segal,
BY: Chas. W. Gerard
ATTORNEY

Patented May 5, 1931

1,804,184

UNITED STATES PATENT OFFICE

HYMAN SEGAL, OF KANSAS CITY, MISSOURI

AUTOMATIC SAFETY STOP

Application filed December 18, 1929. Serial No. 414,999.

The present invention relates to vehicle stop devices, and aims to provided a novel and improved form of stop mechanism which may be operated in an emergency for the purpose of bringing the vehicle to an abrupt and immediate stop, as quickly as possible consistent with safety.

Accordingly, the invention comprises a stop mechanism adapted for use in connection with the traction wheels of a vehicle, and comprising shoes which are adapted to be released in the path of and directly in front of the traction wheels and thereby interrupting the tractive action of the wheels upon occasions requiring the stopping of the vehicle in an emergency.

A further object of the invention is to provide a construction of this character adapted to be applied to vehicles generally, and operative manually at the will of the driver, but particularly useful for the automobile type of vehicle, where the mechanism is rendered automatically operative as well as manually operative, for the purpose of releasing the stop mechanism in case of collision with a pedestrian or other object and thereby stopping the vehicle independently of any action on the part of the driver.

It is also sought to provide an improved stop mechanism for emergency stop purposes not only in case of a collision, but also useful for vehicle stopping purposes under other circumstances, as where the vehicle displays a tendency to skid in dangerous locations, when the operation of the device will immediately overcome such skidding action and bring the car safely to a stationary position.

It is further sought to provide a practical and efficient construction for carrying out all the desired functions of a stop mechanism, and adapted to be installed in practically any of the commercial forms of automobiles without material change or alteration of present designs.

With the foregoing general objects in view, the invention will now be described with reference to the accompanying drawing, illustrating one practical form of embodiment of my proposed improvements, after which those features and combinations deemed to be novel will be set forth and claimed.

In the drawing—

Figure 1:
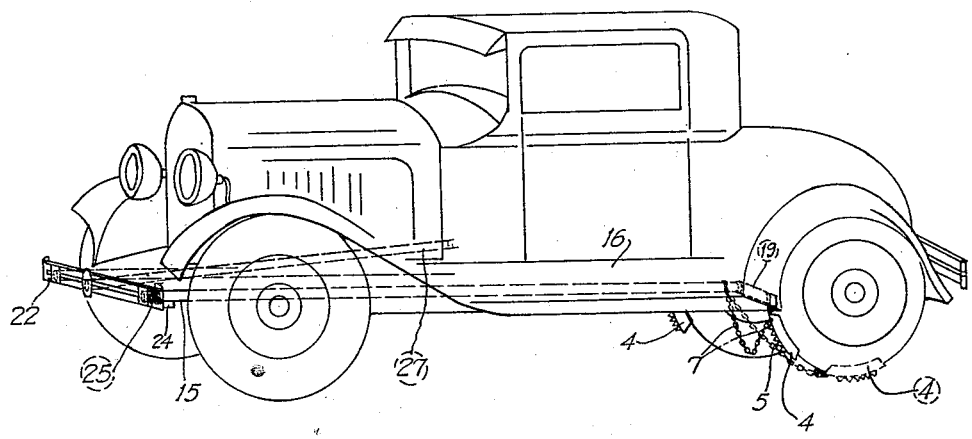
Figure 1 is a perspective view illustrating an automobile equipped with a stop mechanism embodying the present invention.

Referring now to the drawing in detail, this illustrates my improved automatic stop mechanism as comprising a pair of shoe members 4 of channel form having transverse tread corrugations 5, these shoes 4 being adapted to be suspended in inoperative position in front of the rear or traction wheels 6 of the car, the position being such that, on release of the shoes as hereinafter described, they will drop to the ground directly in front of said wheels in position for the wheels to ride into and upon the shoes as illustrated in Figure 1. The shoes are attached to short flexible chains 7 for the purpose of anchoring the shoes to the chassis frame 8 of the automobile, whereby the shoes are allowed only a limited extent of rearward movement after being released as shown in Figure 1.

Each of the shoes 4 has one end provided with an extension 10 formed with a square opening for engagement with a square retaining pin 12 which is supported by a lateral arm 14 attached to the rear end of a tubular guide member 15, there being a pair of these tubular guide members 15, one along each of the side frame members 8 forming the chassis of the car, and preferably disposed between the frame 8 and the mud skirt or apron 16.

Within each of the tubular guide members 15 is mounted a longitudinally extending rod 18, the rear end of which carries an arm or finger 19 constituting a detent and releasing element having an opening for engaging one of the pins 12 and also having a channeled upper margin 20 for fitting over the square upper portion of the extension 10 of the corresponding shoe 4. By this means it is apparent that when the shoe is suspended in inoperative position, the square form of pin 12 as well as the fitting of the edge or marginal portion of the extension 10 within the channeled portion 20 of the finger 19 prevents any sidewise turning or swinging movement of the shoe, and the finger 19 insures retaining engagement of the extension 10 upon the pin 12. Moreover, when the finger 19 is operated rearwardly in the shoe-releasing action, it is apparent that this releasing operation is made positive in its action by virtue of the turned over or channel form of the finger 19 in engagement with the upper margin of the extension 10, thereby serving to exert a positive pulling action upon said extension and insuring disengagement of the shoe from the pin 12.

Figure 2:
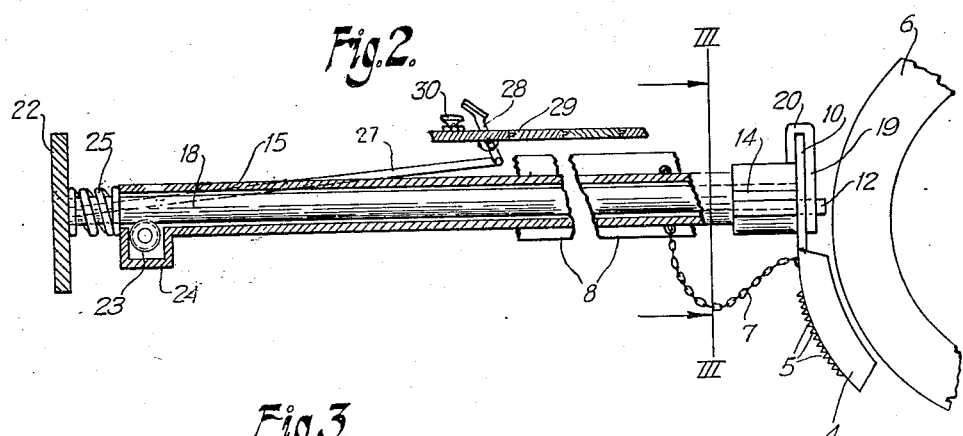
Figure 2 is an enlarged sectional detail view illustrating the essential parts of the stop mechanism.
Figure 3:
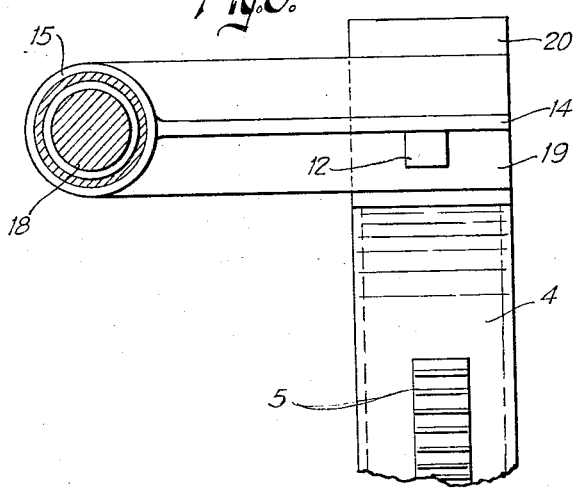
Figure 3 is a similar sectional detail representing a section taken on the line III—III of Figure 2, but on a still larger scale.

The forward ends of the rods 18 are attached to the bumper member 22 in any desired manner, and suitable rollers or sheave wheels 23 may be provided, in appropriate boxes or cages 24 at the forward ends of the tubular members 15, as shown in Figure 2, thereby serving to lend greater freedom of movement to the longitudinal sliding action of the rods 18. Between these forward ends of the tubular members 15 and the bumper 22 are interposed springs 25, the action of which serves to keep the bumper and rods in forward position for maintaining latching engagement between the detent element 19 and the shoes 4, while permitting limited rearward movement of the bumper and rods, in the shoe-releasing operation.

The central portion of the bumper 22 is provided with a pull rod 27 having its rear end pivotally connected with a pedal or foot lever 28 mounted on the floor board 29 of the car (Figure 2) in convenient position for operation by the driver for manually producing the rearward operating movement of the rods 18 to release the shoes under any other condition, aside from a collision, which may render the operation of the stop device desirable. A latch or catch member 30 is mounted adjacent to the lever or pedal 28 for temporarily securing the rods 18 in rearwardly retracted position, as is necessary for remounting the shoes 4 in suspended or inoperative position, after each releasing operation of the same.

In the operation of the device, it is apparent that in the event of the collision of an object with the bumper 22, the latter will be actuated to produce rearward movement of the rods 18, and consequent releasing action of the detent elements 19, to effect the release of the shoes from their suspended position, whereupon the shoes will be dropped to the ground directly in front of the wheels 6 in position for the latter to ride into and upon the shoes, as represented by dotted lines in Figure 1. This immediately interrupts the tractive force of the wheels 6, and produces a practically immediate stop of the vehicle's motion. Such immediate stopping action is especially desirable in the event of the vehicle striking a pedestrian, particularly as the driver may not be immediately aware of the fact that a person has been struck and the car may not otherwise be brought to an immediate standstill by the driver's own action. Not only may the car be thus automatically stopped independent of any action on the part of the driver, but the operation may be rendered effective in other emergency conditions, at the will of the driver, by operation of the pedal 28 to release the shoes, as in the case of a skidding motion of the car, particularly in dangerous locations, when the release of the shoes 4 into operative position will effectually and immediately bring the car to a standstill in a safe position.

It is thus apparent that a practical and extremely efficient mechanism has been devised for embodying the proposed improvements, and that the arrangement and construction comprise a minimum number of parts for fulfilling the necessary functions, without any complicated structure that would be at all likely to become out of order. After each operation it is only necessary for the driver to latch the pedal 28 temporarily while the extension portions 10 of the shoes are relatched in the position illustrated in Figure 2, whereupon the release of the pedal 28 leaves the parts in readiness for further operation as occasion requires.

While I have illustrated and described what is now regarded as one desirable form of arrangement and construction for the practice of my invention, I desire to reserve the right to make all such changes or modifications as may fairly fall within the scope of the appended claims.

I claim:

1. A vehicle stop construction comprising, in combination with the traction wheels of the vehicle, shoes releasable for dropping to the ground in front of said wheels, means for normally retaining said shoes suspended off the ground in inoperative position comprising fixed pins releasably engaging said shoes and movable detent and releasing elements operating in one direction to engage and retain said shoes on said pins and also operative by movement in the opposite direction to disengage and release said shoes from the pins, and manually controlled means for actuating said elements for releasing said shoes.

2. An automatic vehicle stop construction comprising in combination with the bumper and traction wheels of the vehicle, shoes flexibly anchored to the frame of the automobile and releasable for dropping to the ground in front of said wheels, fixed pins releasably engaging said shoes and movable detent and releasing elements operative in one direction to engage and retain said shoes upon said pins and also operative by movement in the opposite direction to disengage and release said shoes from the pins, and actuating mechanism connecting said elements with the bumper for automatic release of the shoes in the event of collision.

3. An automatic vehicle stop construction comprising in combination with the bumper and traction wheels of the vehicle, shoes flexibly anchored to the frame of the automobile and releasable for dropping to the ground in front of said wheels, fixed pins releasably engaging said shoes, movable detent and releasing elements operative in one direction to engage and retain said shoes upon said pins and also operative by movement in the opposite direction to disengage and release said shoes from the pins, and means operable either at the will of the driver or by colliding engagement with said bumper for actuating said elements and thereby effecting release of said shoes from suspended position.

4. A vehicle stop construction comprising, in combination with the traction wheels of the vehicle, shoes flexibly anchored to the frame of the vehicle and suspended in position for dropping to the ground in front of said wheels, a tubular guide member at each side of the vehicle and provided with a pin for supporting engagement with the corresponding shoe, a rod in each of said guide members carrying a detent and releasing finger cooperating with said pin, means acting yieldingly to maintain said rods in position to hold said fingers in shoe-retaining and latching position, and means for actuating said rods in opposition to said first means for effecting release of the shoes.

5. An automatic vehicle stop construction comprising, in combination with the bumper and traction wheels of the vehicle, shoes flexibly anchored to the frame of the automobile and releasable for dropping to the ground in front of said wheels, a tubular guide member at each side of the vehicle and provided with a pin for supporting engagement with the corresponding shoes, a rod in each of said guide members carrying a detent and releasing finger cooperating with said pin, the forward ends of said rods being secured to the bumper, and means holding said rods yieldingly in position for maintaining said fingers in shoe-retaining and latching position while permitting actuation of the rods in the opposite direction in the event of collision for the release of the shoes.

6. A vehicle stop construction comprising, in combination with the traction wheels of the vehicle, a shoe adapted to be released in front of each of said wheels, fixed pins releasably engaging said shoes, movable detent and releasing means comprising elements adapted for embracing both sides of the upper margins of said shoes for either retaining the same in engagement with said pins or positively disengaging the shoes therefrom by a movement off the pins, and means for actuating said elements for effecting the shoe-releasing operation.

In witness whereof I hereunto affix my signature.

HYMAN SEGAL.